(12) United States Patent
Ali

(10) Patent No.: US 7,984,853 B2
(45) Date of Patent: Jul. 26, 2011

(54) REDUCING INTERNAL THEFT AT A POINT OF SALE

(76) Inventor: Muhammad Safder Ali, Canton, MI (US)

( * ) Notice: Subject to any disclaimer, the term of this patent is extended or adjusted under 35 U.S.C. 154(b) by 1005 days.

(21) Appl. No.: 11/752,649

(22) Filed: May 23, 2007

(65) Prior Publication Data

US 2007/0278298 A1    Dec. 6, 2007

Related U.S. Application Data

(60) Provisional application No. 60/809,431, filed on May 30, 2006.

(51) Int. Cl.
*G06K 15/00* (2006.01)

(52) U.S. Cl. ............... 235/383; 235/437; 235/462.15; 902/22; 705/16; 705/18; 705/20

(58) Field of Classification Search .............. 235/383, 235/437, 462.15; 902/22; 705/16, 18, 20
See application file for complete search history.

(56) References Cited

U.S. PATENT DOCUMENTS

| | | | |
|---|---|---|---|
| 4,229,794 A | 10/1980 | Foster | |
| 4,893,237 A | 1/1990 | Unno | |
| 5,883,968 A | 3/1999 | Welch et al. | |
| 5,895,453 A | 4/1999 | Cook | |
| 5,924,079 A | 7/1999 | Brown | |
| 5,969,317 A | 10/1999 | Espy et al. | |
| 5,978,821 A | 11/1999 | Freeny | |
| 6,672,506 B2 | 1/2004 | Swartz et al. | |
| 7,016,862 B1 | 3/2006 | Vassigh et al. | |
| 7,086,584 B2 | 8/2006 | Stoutenburg et al. | |
| 7,100,824 B2 | 9/2006 | Ostrowski et al. | |
| 7,118,026 B2 | 10/2006 | Harris et al. | |
| 2002/0059468 A1 | 5/2002 | Freeny | |
| 2003/0023520 A1 | 1/2003 | Burk et al. | |
| 2003/0078988 A1 | 4/2003 | Freeny | |
| 2003/0098910 A1 | 5/2003 | Kim | |
| 2003/0216969 A1 | 11/2003 | Bauer et al. | |
| 2004/0164863 A1 | 8/2004 | Fallin et al. | |
| 2004/0245332 A1 | 12/2004 | Silverbrook et al. | |
| 2005/0017071 A1 | 1/2005 | Noonan | |
| 2005/0149481 A1 | 7/2005 | Hesselink et al. | |
| 2005/0151489 A1 | 7/2005 | Lys et al. | |
| 2005/0177716 A1 | 8/2005 | Ginter et al. | |
| 2005/0189412 A1 | 9/2005 | Hudnut et al. | |
| 2005/0211773 A1 | 9/2005 | Nobutani | |
| 2005/0261938 A1 | 11/2005 | Silverbrook et al. | |
| 2006/0080656 A1 | 4/2006 | Cain et al. | |

OTHER PUBLICATIONS

Inventor's Declaration from continuation PCT application PCT/US2007/012548.*

* cited by examiner

*Primary Examiner* — Michael G Lee
*Assistant Examiner* — Kristy A Haupt
(74) *Attorney, Agent, or Firm* — Knobbe, Martens Olson & Bear LLP

(57) ABSTRACT

A method, procedure and operational function of the business for inhibiting internal theft of items without inventory identifiers are provided. In one aspect, the method comprises receiving an item for sale at a POS terminal, wherein the item is missing an inventory identifier. After the item is received, a determination is made as to whether a description of the item is stored in an inventory system. If the item is not stored in the inventory system, the sale of the item is inhibited. Thereafter, the entry of identifying information in the POS terminal is requested such that the identifying information identifies the item such that the description of the item can be stored in the inventory system.

16 Claims, 8 Drawing Sheets

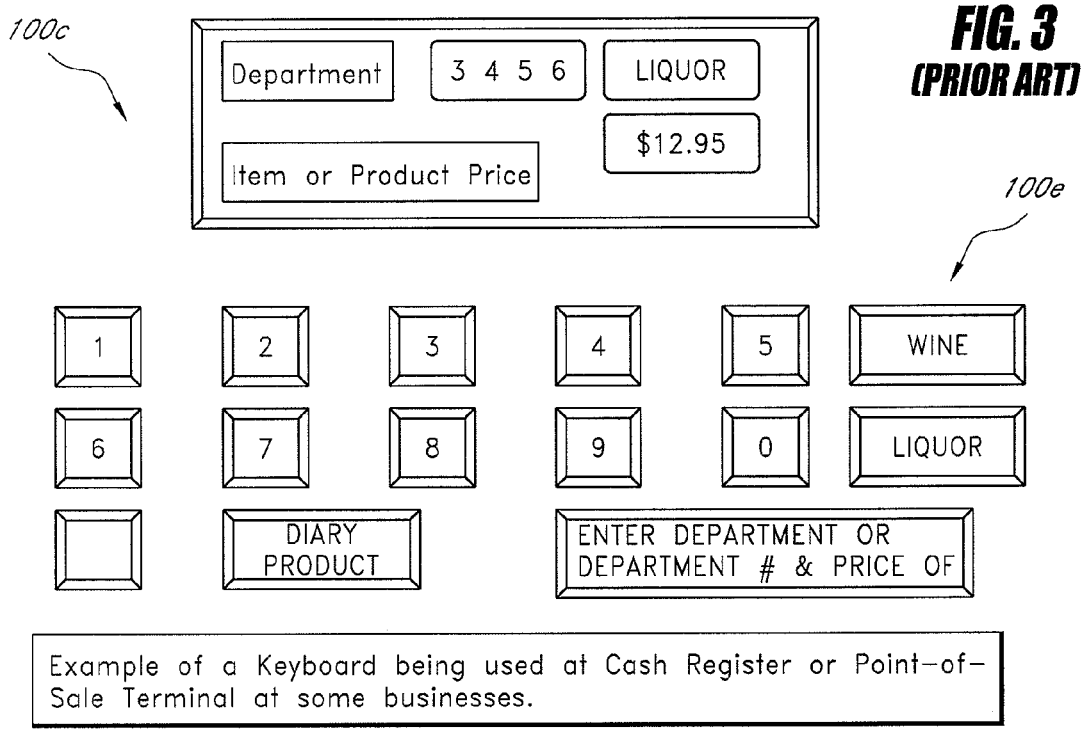

FIG. 3
(PRIOR ART)

Example of a Keyboard being used at Cash Register or Point-of-Sale Terminal at some businesses.

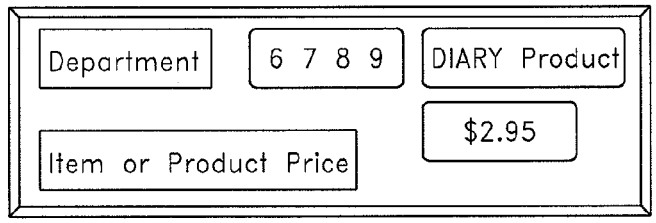

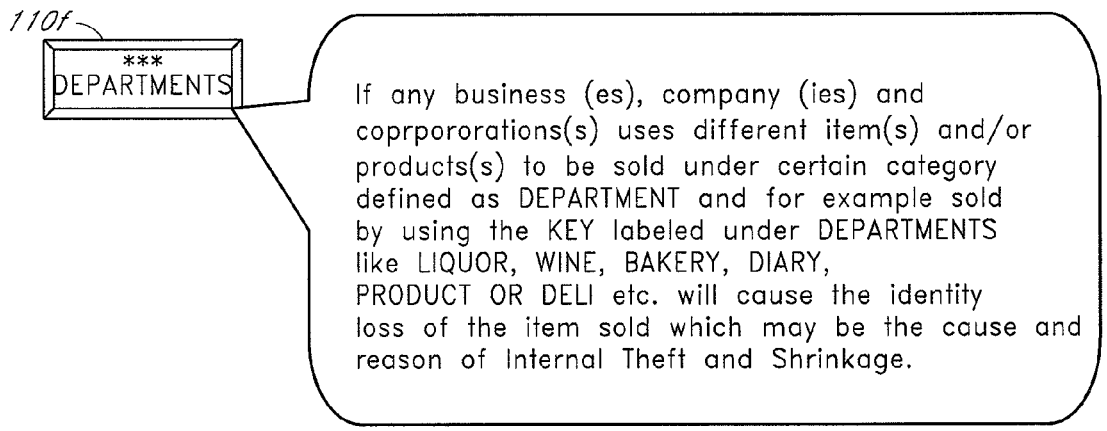

If any business (es), company (ies) and coprpororations(s) uses different item(s) and/or products(s) to be sold under certain category defined as DEPARTMENT and for example sold by using the KEY labeled under DEPARTMENTS like LIQUOR, WINE, BAKERY, DIARY, PRODUCT OR DELI etc. will cause the identity loss of the item sold which may be the cause and reason of Internal Theft and Shrinkage.

All the business(es), company(ies) and corporation(s) using above method, procedure or systems to sell their items and/or product at the Point of Sale Terminal and/or Cash Register are subject to Internal Theft and/or Shrinkage.

The item details are present in the inventory system/data bank then the sale of such product will not be allowed normally as it cannot be audited later. Any sale of such merchandise will leave the cash in hand at the POS but the merchandise sold will remain unidentified in the inventory system leaving the business vulnerable to inventory, invoice theft and shrinkage (in the business). Sale of any unidentified merchandise (without scanning process) will also leave the security personnel and camera dysfunctional as security system does not oversee or supervise the approved method, procedure and operational function of POS system in the business. An efficient POS System will also be an effective tool to reduce the the cost incurred on security personel, camera & other equipments hired or purchased for the purpose.

618 —

The system will force the cashier to enter full (mandatory) details on a separate screen as defined in FIG 7 or the like, to compare with the Inventory system/Data Bank in order to retrieve the related merchandise details (that matches with the merchandise details presented by the customer at the POS). If the system matched with the merchandise details then it will be able to generate the barcode of the merchandise, which then can be printed on the sticky lable and stick it with the merchandise. The cashier will then be able to scan the merchandise with the bar code and complete the sale as a normal sale as the merchandise can now be identified, recognized and compared" with theinventory/data bank systems as the specific merchandise sold will have the same barcode stored in the system" designated to that merchandise.

620 —

After following the STEP-6 and IF still the merchandise cannot be found in the inventory system/data bank then a picture or scanned image (2D or preferably 3D) of the merchandise must be taken and restored in the screen as defined in FIG 7 for the follow up and tracing purposes as to why the merchandise was not in the Inventory/Data Bank System. The sale will continue as per store procedure or Manager's direction. The system will generate a unique barcode for such merchandise (that will later confirm the identification, sale and audit of such products). It can be electronically saved as per FIG 7 or printed on the sticky lable and stick with the printed report after each such transaction. System should also print on the customer receipt in bold letters merchandise identified by cashier. Automatic E-mails should be sent to the Store Manager to show cause and the Higher Authorities (for example Director Purchasing, Marketing, Sales & Security) for thier review and follow up as to why the merchandise failed to be scanned or identified at POS System.

| INVENTORY DATA BANK RETRIEVAL SYSTEMS FOR UNSCANNABLE (UNIDENTIFIED) MERCHANDISE/PRODUCTS ||||
|---|---|---|---|
| *Cashier/Rep. Name:* | *First:* | *M.I.* | *Last:* |
| *Cashier/Rep. ID No:* | | *Date:* | *Time:* |
| *Business Name:* | | *Location:* | |

*Above information can be AUTO generated as soon the cashier uses this screen.*

| Enter Bar Code Standard: | UPC: xxxxx xxxxx || Other: yyyyy yyyyy ||
|---|---|---|---|---|
| PRODUCT ID:<br>Press any combo. | Name<br>(X) | Manufacture<br>(X) | Weight<br>(X) | Size<br>(X) | Price<br>(X) |
| IDENTIFY PRODUCT BY ALL OF THE ABOVE METHODS (Press this button) |||||

*Enter the Data for unscannable merchandise and or product*

| Product Name: | | | | | |
|---|---|---|---|---|---|
| Manufacture/Distributor: | | | | | |
| Weight: | ___ Oz | ___ ml | ___ lb | ___ Kgs ||
| Size: | Small | Medium | Large | X Large | XX Large |
| Other Information to identify the merchandise or product like contents, ingredients etc. | | | | | |

*Store the photograhp or image (2d or Preferably 3D) HERE of the merchandise that cannot be identified or scanned at the Point of Sale or Cash Register.*

| Print the lable (hard copy) of the unique Bar Code | Store the image (soft copy) of the unique Bar Code (here) |
|---|---|

NOTE

*Data entry of the unidentified/unscannable merchandise is REQUIRED in the above format to identify the merchandise from the INVENTORY DATA BANK. Please ENTER the name of the product, Manufacture / Distributor, weight, size, price and any other information that will help narrow the search and retreive the nearest findings/information of the merchandise from the inventory data bank in ALPHABETICAL ORDER. This will help sort out and retrieve the desired merchandise information for sale. If by any reason the merchandise is NOT available in the data bank then follow the FIG. 5 step 620 instructions. It is quite possible that entry of BAR CODE may retrieve the desired information.*

FIG. 7

REDUCING INTERNAL THEFT AT A POINT OF SALE

CROSS-REFERENCE TO RELATED APPLICATIONS

This application claims the benefit of U.S. Provisional Application no. 60/809,431, filed May 30, 2006.

BACKGROUND

1. Technical Field

The present disclosure relates to mechanisms, methods, procedures and operational functions for reducing and/or inhibiting employee theft, undercharging, or overcharging for items at a Point of Sale (POS) and shrinkage in the business.

2. Description of the Related Art

Point of sale (POS) systems are used to process transactions in most businesses, including grocery stores and retail establishments. A POS system typically includes a POS terminal, which may be a cash register or the like. The POS terminal is typically operated by a cashier but may also be self-operated, such as a POS terminal at a self-checkout line in a grocery store or retail business. When a customer is ready to purchase merchandise, the customer presents the item at the POS terminal. The item may have a barcode or other identification device that enables the POS terminal to find the price of the item in an inventory system. Once the item is sold, the POS terminal updates the inventory system with information about the sale.

Businesses that use POS systems often have problems preventing theft by employees, which is referred to as "internal theft" that causes "shrinkage" in the business. Many businesses have a flawed operational function or system at their POS terminals. This weakness in the business operational system allows the cashier and people in authority over the cashier to manipulate the POS terminal to their advantage and steal from the business by bypassing inventory systems that rely on tracking of inventory identifiers at the POS, thereby causing shrinkage in the business. This internal theft or shrinkage is often performed without any notice or trace as to what actually happened. Internal theft puts the business owner, company, and/or corporation in a very disadvantaged position, where they fail to reap or earn the profit in their business or even go out of business. Undercharging or overcharging for items based on erroneous pricing data resulting from missing inventory identifiers also results in shrinkage of the business. Internal theft, undercharging, or overcharging is difficult to track and can be even more difficult to prevent.

To further illustrate these and other problems, FIGS. 1 through 3 illustrate example prior art POS terminals 100. In particular, FIGS. 1 through 3 illustrate payment keys 110 on a POS terminal 100 that enable an employee to enter into a transaction without identifying an item or by inadequately identifying the item. This lack of identification facilitates internal theft.

Situations and conditions giving rise to internal theft include where employees, such as cashiers fail to identify merchandise on the receipt at the POS terminal 100. This is actually a faulty POS system, procedure, business method and/or business operational function that allows such incidents to happen in the business. By not identifying the merchandise or products at the POS, the employee has an opportunity to pad the amount of the sale on general terms like department sale, taxable item or non-taxable item or same sort of sale that fails to identify the product and or merchandise sale that cannot be verified, matched and/or compared with the inventory or the data bank representing the particular sale of the item in the business. Such faulty POS systems would enable a cashier or dishonest employee of any authority in the business system to manipulate the POS system to their advantage and pocket the difference. Through the complexities of inventory systems, some items are not inventoried, and for such items, some businesses offer keys 110 to enable the POS terminal to process a sale of such items. The illustrated payment keys 110 include a taxable payment key 110a, a non-taxable payment key 110b, a pharmacy taxable payment key 110c, a pharmacy nontaxable payment key 110d, various specific department keys 110e, and a general department key 110f.

In some businesses, any product and or merchandise can be sold using the keys 110 without knowing what item has been sold and for what price even if the item was a scannable product or merchandise there may be no way to stop anyone, whether cashier or manager, from selling that item for a different price. If any item is not fed into the scanning system or the POS perpetual inventory control system or data bank system by "mistake" then such merchandise can easily be sold at any price by anyone at anytime. In effect, the keys 110 provide employees an opportunity of manipulating the price at their own will. This problem arises particularly in businesses who categorize their inventory into departments such as "Deli," "Floral," "Wine," "Meat," and "Produce," where the items sold in these departments are of different varieties, kind and cost. These items are often not individually identified and thus may be purchased through the use of a generic key 110. Because the items are not identified in the sale, they are also not identified on a customer receipt or are identified only generically, which leaves the option open for a sale of the item that cannot be matched or audited with products and/or merchandise in the inventory. As such, the products and or merchandise disappear from the inventory system without causing any alert to the sales system, the security personnel or the camera.

As an example, management may suggest the price of a certain item to be $6.00, but the item is not identified in the inventory system and a price gun is used by an unscrupulous employee to mark the price of the item to be $8.00. This way, the item will be sold at the price marked, and the difference in the amount charged will enable the manager to later adjust the inventory of the item when the next shipment comes by simply "receiving it on paper" or by "returning" the shipment later as a mistaken delivery. Thus, there are enough funds to show that the item was actually received and also sold in the store, but in actuality adjustments can be made to show the entire process has taken place after the inventory has arrived which actually has never entered the store. As illustrated graphically by FIG. 4, dishonest managers 406 and directors 408 may contribute to internal theft and shrinkage in the business more than cashiers 404 and customers 402, and they may commit such fraud through internal theft systems similar to the system set forth above. The internal theft systems enable dishonest employees to complete the paper requirements, but actually cause the shrinkage in the business without knowledge of security personnel and out of sight of the security cameras. Since the system allows the sale of a generic taxable item, there is no way to prove that the shipment or inventory was ever received. If such items were sold under a generic key 110 (e.g., TAXABLE ITEM OR NON TAXABLE ITEM or of the same sort key) and not as a particular item which actually came as per inventory, there is no way to detect what came in the store and what was sold. In another words the merchandise sold at the POS terminal failed to match the item with the inventory data base and also failed to take out or reduce the item from the inventory (no perpetual inventory will occur in such conditions) leaving the misinformation that item is still there (later causing shrinkage in the business after an audit is done). Whereas such sale generates the cash that has happened due to unidentified sale actually gives the dishonest employee the ability to adjust or use the money to adjust any sale or pocket the difference without any knowledge as it would not alert anyone including security personnel and or camera as they will have no knowledge as to what actually has happened.

These inventory problems also create accounting and auditing problems where inventory received and sold cannot be reconciled or balanced. When items with barcodes or other identifying information are purchased, they are purchased on the definite product identity, size, weight and price basis, but when the same items are sold using a POS terminal 100 incorporating the keys 110, the items lose their identity in the accounting, auditing and inventory system. In addition, local, state, and federal governments lose tax revenue when internal theft occurs.

There have been few incentives to change the problem that occurs due to unidentified product sales which is by means of improving the business method, procedure and or operational functions. Businesses can effectively ignore the problems identified above when they are selling almost 90 to 95% of their products by means of scanning. However, significant profits may also be regained on the 5 to 10% of the remaining products.

With the help of an improved system, method, procedure and operational function provided by the present invention, internal theft, undercharging, and overcharging can be inhibited and shrinkage in business can be reduced remarkably.

SUMMARY

It is one object of the invention to provide a method for inhibiting internal theft of merchandise missing inventory identifiers. It is another object of the invention to provide a method for inhibiting undercharging or overcharging for items at a Point of Sale (POS). The method comprises receiving an item for sale at a POS terminal, wherein the item is missing an inventory identifier. A determination is made as to whether a description of the item is stored in an inventory system. If the item is not stored in the inventory system, the sale of the item is inhibited. The entry of identifying information in the POS terminal is requested, such that the identifying information identifies the item such that the description of the item can be stored in the inventory system.

Neither this summary nor the following detailed description purports to define the inventions. The inventions are defined by the claims.

BRIEF DESCRIPTION OF THE DRAWINGS

The following drawings further describe by illustration the advantages and objects of the present disclosure. Corresponding figure reference characters within the "DETAILED DESCRIPTION" section reference each drawing.

FIGS. 1-3 depict perspective views of various example prior art POS terminals;

FIGS. 6A and 6B are flow chart diagrams illustrating an embodiment of a process for preventing internal theft at a POS terminal.

FIG. 7 is an embodiment of an inventory data bank, retrieval system for unscannable (unidentified) merchandise/products.

Figure 1:
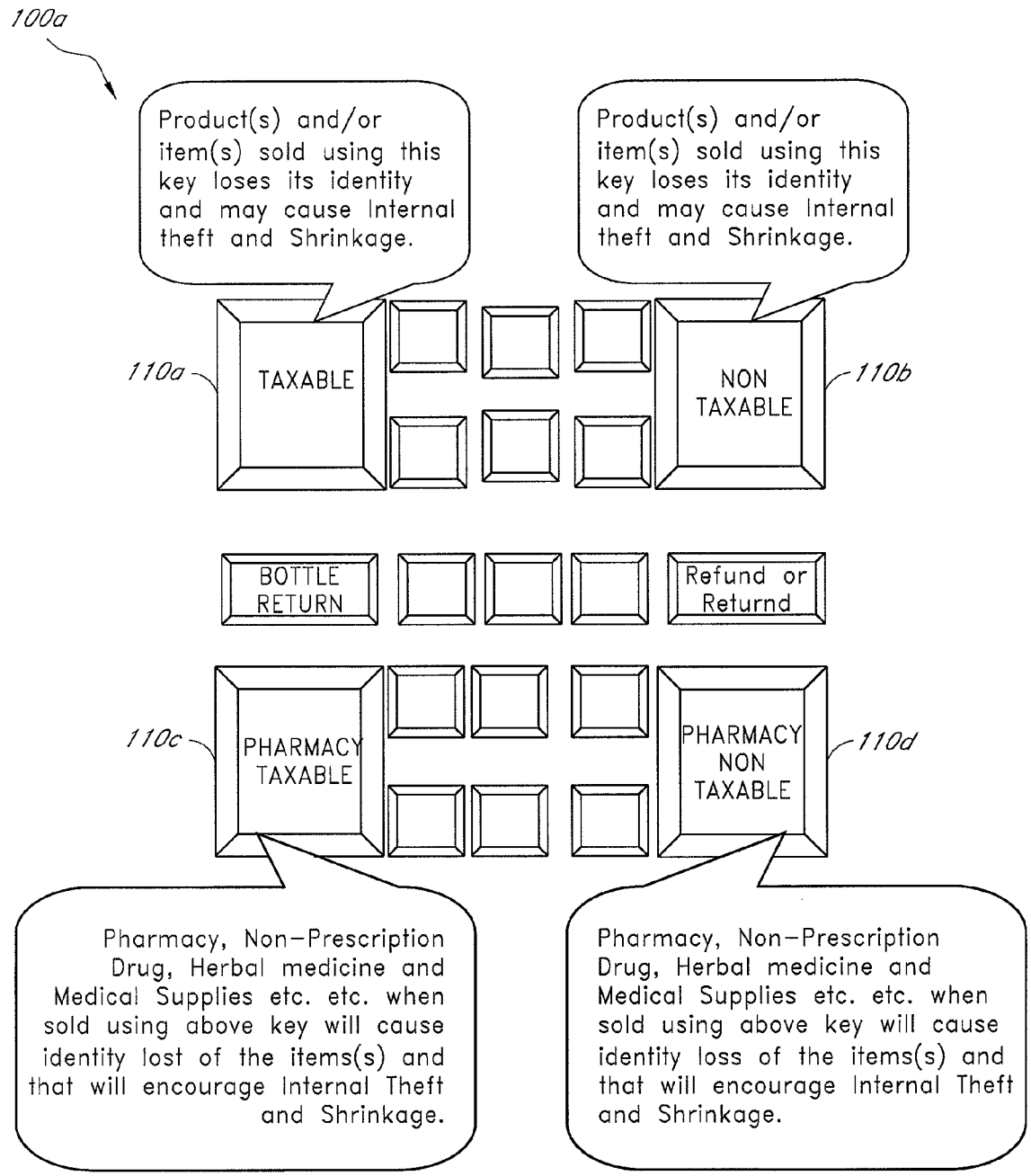
Figure 2:
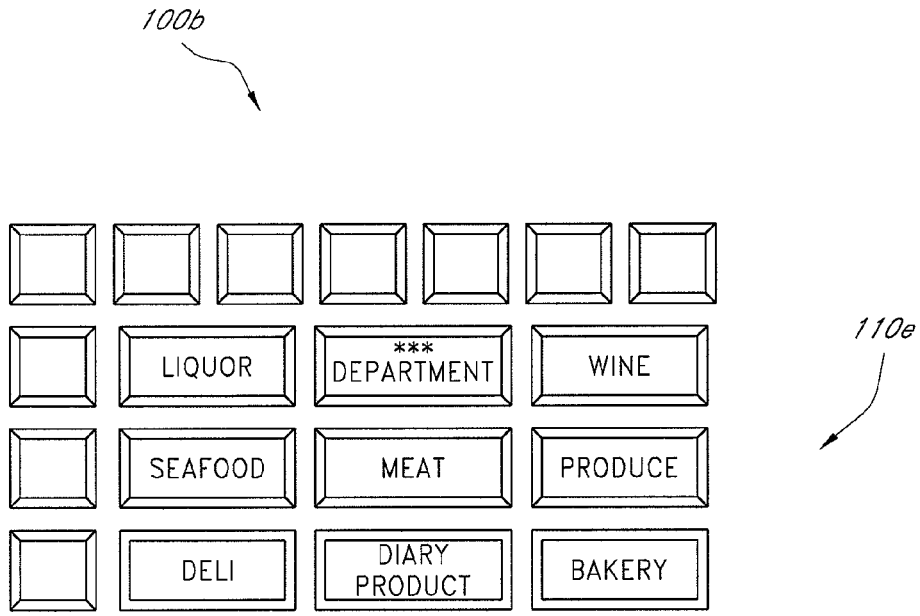
Figure 4:
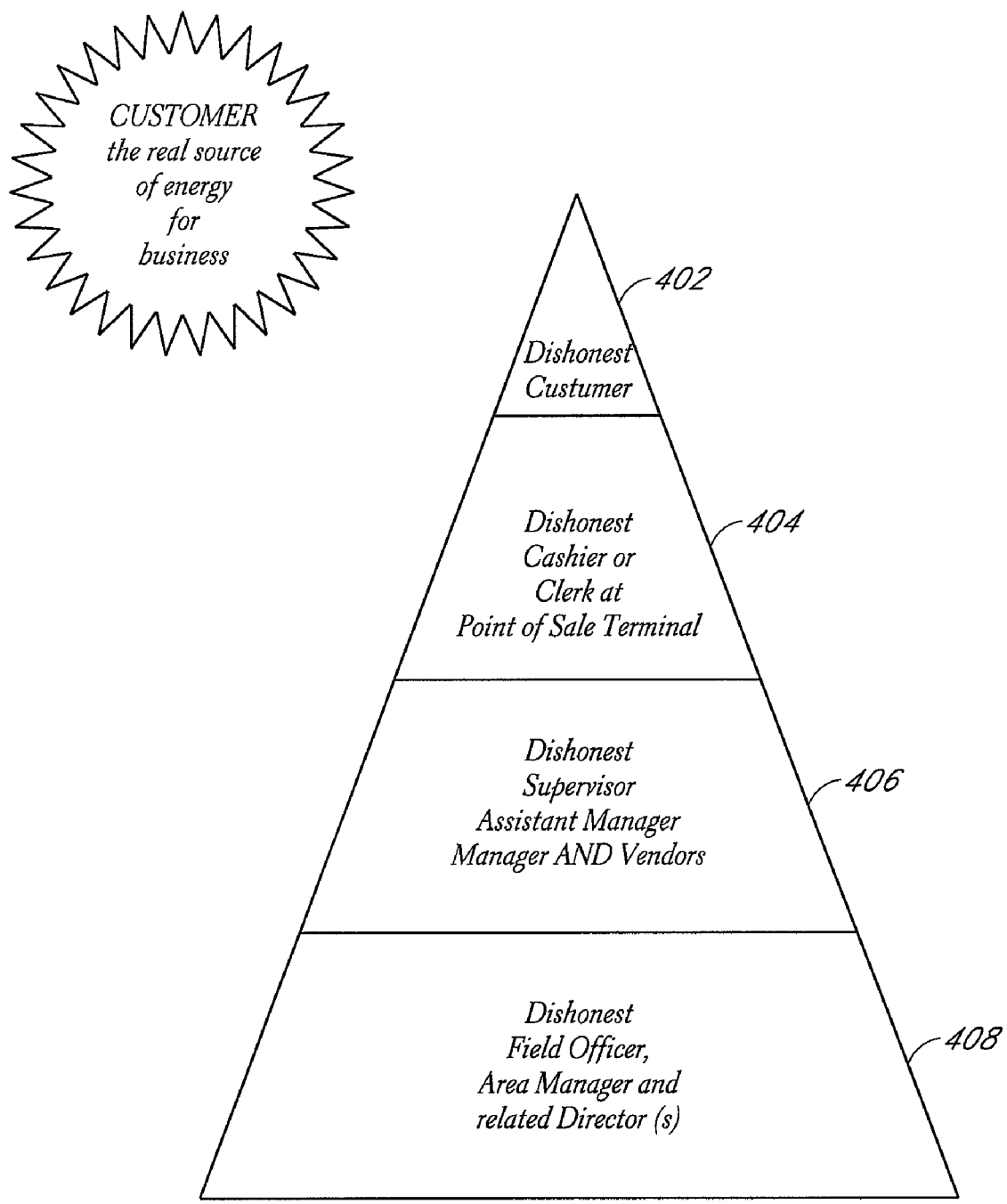
FIG. 4 is a pyramid diagram illustrating various sources of internal theft causing shrinkage and enormous loss to the business.

In the foregoing description, referenced to the drawings, certain terms have been used for conciseness, clarity and comprehension. However, no unnecessary limitations are to be implied from or because of the terms used, beyond the requirements of the prior art, because such terms are used for descriptive purposes and are intended to be broadly construed. Furthermore, the description and illustrations are by way of example, and the scope of the disclosure is not limited to the exact details shown, represented or described.

DETAILED DESCRIPTION

A method is provided for inhibiting internal theft of items without inventory identifiers. The method comprises receiving an item for sale at a POS terminal, wherein the item is missing an inventory identifier. A determination is made as to whether a description of the item is stored in an inventory system. If the item is not stored in the inventory system, the sale of the item is inhibited in response to the determination that the description of the item is not stored in the inventory system. The entry of identifying information in the POS terminal is permitted, the identifying information configured to identify the item such that the description of the item can be stored in the inventory system.

In another aspect of the invention, the sale of the product or merchandise proceeds in response to the entry of the identifying information that is stored in the inventory control system attached with the computerized sales terminal and again the part of the Point of Sale perpetual inventory control system.

In a further aspect of the invention, the entry of the identifying information of the product and or merchandise in the POS terminal further entails requesting a scanned image (2D or preferably 3D) and or picture of the merchandise.

In yet another aspect of the invention, the entry of identifying information of the product and or merchandise in the POS terminal further comprises requesting a description of the merchandise.

In a further aspect of the invention, a barcode is provided to identify the item in response to the entry of identifying information for the unidentified products or merchandise and also the one that cannot be scanned at the POS.

In yet another aspect of the invention, a radio-frequency identification (RFID) tag and or applicable barcode standard is used to identify the product and/or merchandise in response to the entry of the identifying information.

In another aspect of the invention, all the keys of the POS and or Cash Register and the authorities in hierarchy (i.e. Cashier, Supervisor, Manager and or Director) are DISABLED and declared NULL AND VOID PRACTICE respectively that would allow the sale of the merchandise that cannot be scanned at the Point of Sales Terminal and or Cash Register or cannot be identified by the Inventory Data Retrieval System FIG. 7. In other words, if the merchandise cannot be scanned or identified by the Inventory Data Retrieval System it will sell with a unique bar code duly identified by the CASHIER ONLY.

Figure 5:
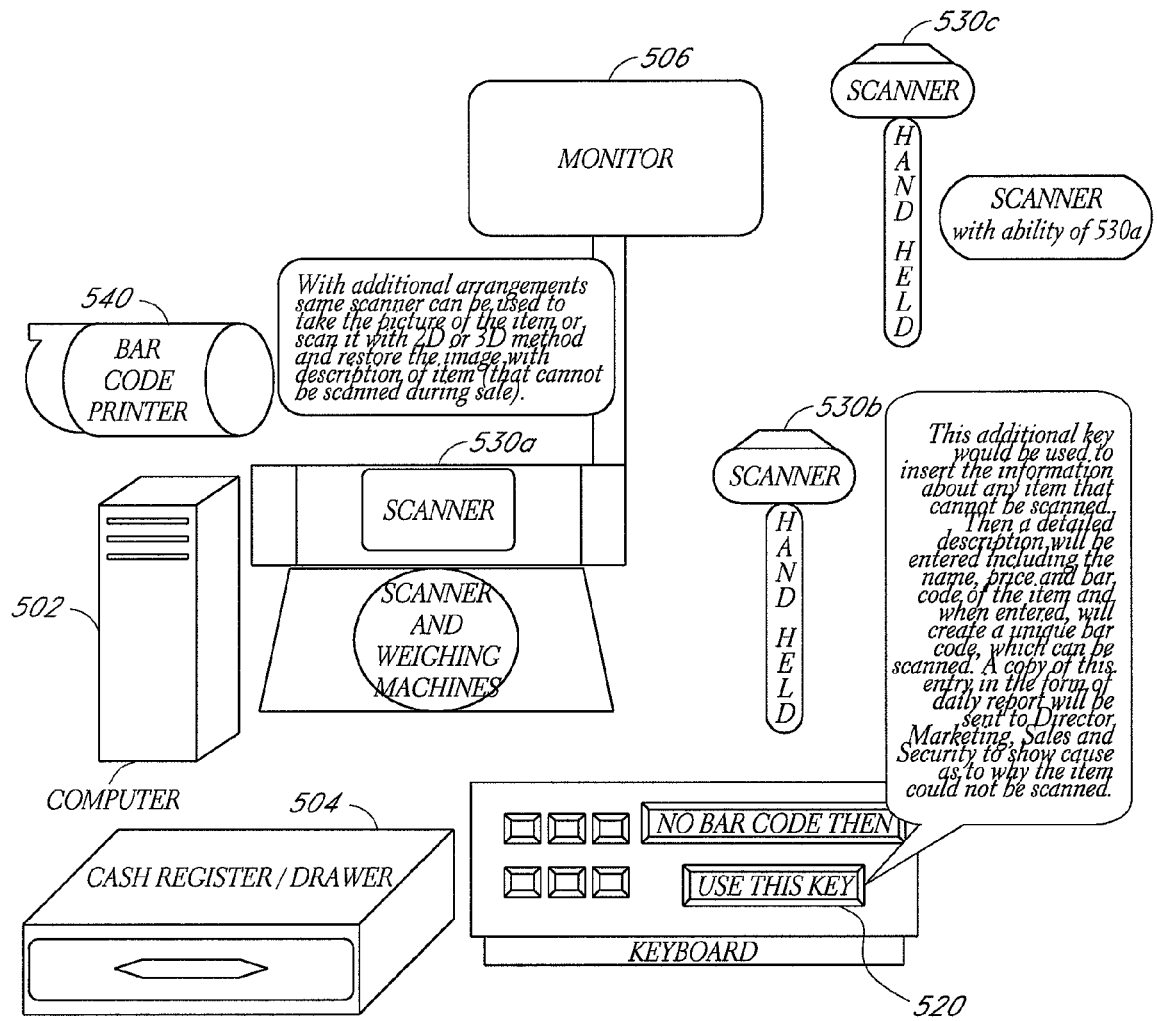
FIG. 5 is a perspective view of an embodiment of an enhanced POS terminal.

Turning to FIG. 5, an example embodiment of an enhanced POS terminal 500 is shown. The secure POS terminal 500 of various embodiments includes a computer 502 for processing sales, returns, and the like, a cash register 504 for holding money and receipts, a monitor 506 for displaying sale information, and one or more scanners 530, including a stationary scanner 530*a* and handheld scanners 530*b*, 530*c*. In an embodiment, each of the scanners 530*a*, 530*b* and 530*c* may be similar types of scanners with different designs to fit and suit sales requirements such as for scanning bar code information, taking the picture and or images of the merchandise after scanning it, to store the information in the inventory Data Bank or other storage of similar type. In addition, the exemplary POS terminal 500 shown includes an item identification key 520 and a bar code printer 540.

In an embodiment, generic keys such as the keys 110 are not included in the POS terminal 500. Instead, products or merchandise are purchased through scanning on the scanner 530. Alternatively, one or more of the keys 110 are included, such as in a legacy POS terminal, but a software component or hardware device disables the use of the keys 110. As a result, the cashier, customer service agent, or other employee does not or cannot change the price of a product at their own will, but only the central control or headquarters controlling the inventory system or the data bank can change the price. Advantageously, internal theft may be reduced by eliminating the keys 110 and forcing the cashier to scan items for purchase.

The item identification key 520 is used in one embodiment when an item presented for sale does not include a bar code or other inventory identifier and fails to be matched with the Inventory Data Bank. Activation of key 520 will retrieve the format from the system defined in FIG. 7 for compliance. In one implementation, the POS terminal 500, upon receiving the item without a bar code or other inventory identifier, will inhibit the sale of the merchandise as normal sale and force the cashier to follow the step defined in FIG. 7. One of skill in the art will appreciate that many other characteristics of the item may also be provided. This description provides a benefit of creating identifying information for an item that previously had no (or insufficient) identifying information. In one implementation, a copy of the description is sent to a manager or a higher supervisor, who will see the cause of why the item was not scanned.

In an embodiment, the bar code printer 540 prints a new bar code for the item in response to the POS terminal 500 receiving the description of the item. This bar code may be used to scan the item, thereby enabling the tracking of the sale in the inventory system. A soft copy of the similar bar code can be saved in the provisional space as assigned in the FIG. 7. This method is intended to record such sales both on hard and soft copies for the sale, audit and inventory adjustment purposes. In another embodiment, a radio frequency identification (RFID) device is provided. Other identifying devices may be provided as will be understood by the skilled artisan.

Prior to the item being offered for sale, in one embodiment when the shipment, inventory, or store order is received, it is preferably immediately keyed in to feed the information to the headquarters or perpetual inventory central control system. If any item is not received in incoming shipment that shows on the invoice as "taxable item," "non-taxable item," "pharmacy taxable," "pharmacy non-taxable," or department "wine," "liquor," or "produce," and such item is not reported to the center as described above, then first of all purchase orders are preferably not placed without proper identification of the merchandise needed for the business/store and therefore this is where it creates a greater mismatch between the shipment received and inserted into the perpetual inventory control system and the sale of the same merchandise at the POS Terminal or Cash Register.

When this discrepancy is corrected it will reduce and or minimize the internal theft and shrinkage in the business as there is no reason why such item should not be available in the inventory system upon receipt as when the order is placed as a particularly identified merchandise or product needed in the store through EDI Electronic Data Interchange or other methods, which is of particular type, size, price. The shipper sends back to the store the very product or merchandise as per the placed order therefore, there is no reason why such items will not have a particular identity, bar code or other identifier.

Figure 6A:
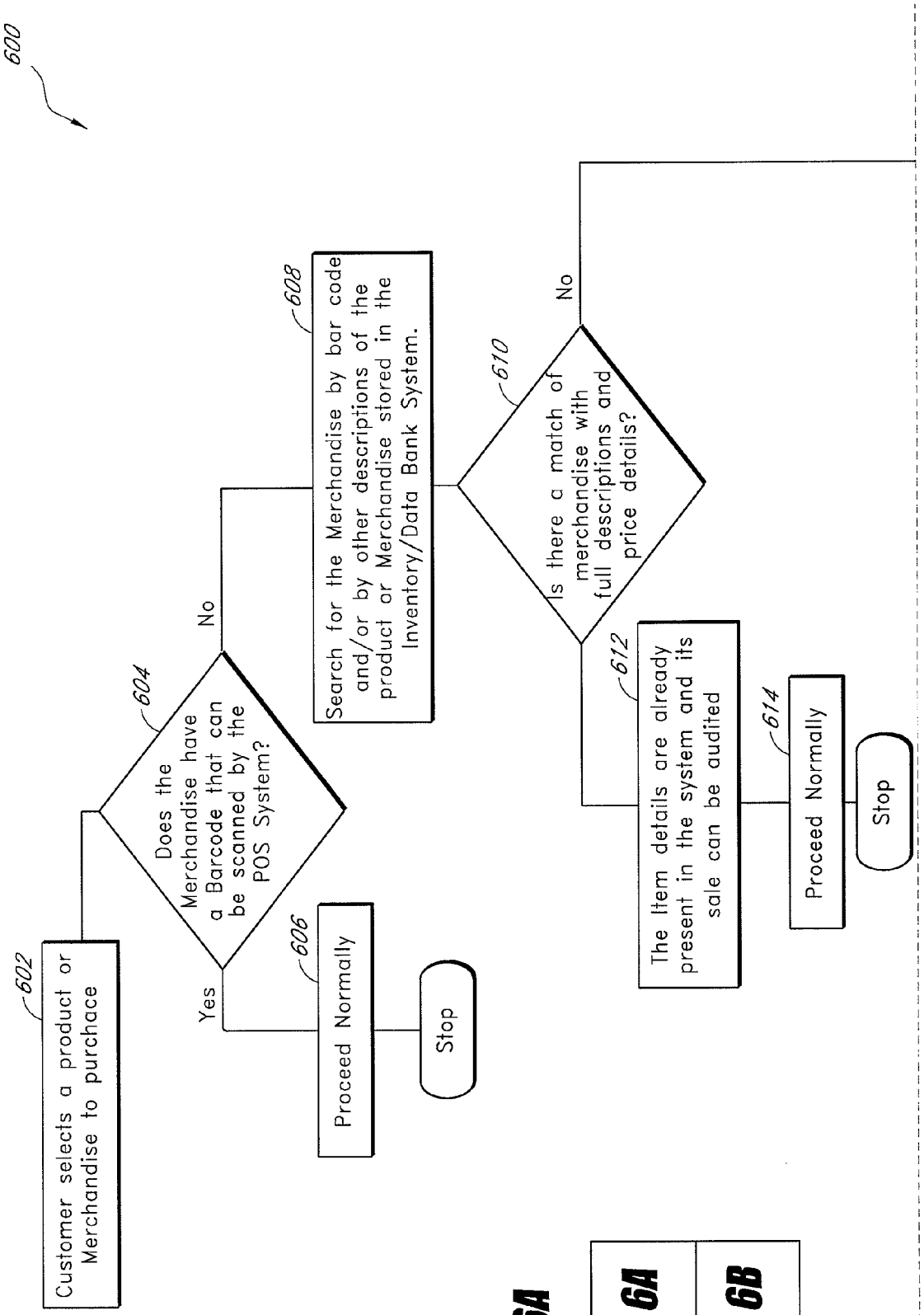

FIGS. 6A and 6B illustrate an example process 600 for preventing internal theft. Certain steps of the process 600 may be performed by one or more software components installed on a POS terminal, such as the POS terminal 500. In addition, certain steps may be performed at least in part by a cashier or other employee of the business, or in the case of a self-checkout POS terminal, by a customer.

At 602, a customer selects an item to purchase. The process 600 may then determine at 604 whether the item has an inventory identifier such as a barcode that can be scanned by the POS system. If it does, the process 600 may proceed normally at 606 by commencing with the sale transaction. On the other hand, if there is no bar code or any other inventory identifier on the item, the process 600 at 608 determines whether a description of the item is stored in an inventory system. Determining whether the description of the item is stored in the inventory system may include comparing a description of the item to the descriptions of items stored in the inventory system. Alternatively, determining whether the description of the item is stored in the inventory system may include comparing a scanned image of the item to images stored in the inventory system. The process 600 typically determines whether the description of the item is stored in the inventory system by searching for the item by description in the inventory.

The process 600 then determines whether there is a match with full description and price details in an inventory system at 610. If there is a match, sale proceeds at 612 and at 614 since the item details are already present in the system and therefore the sale can be audited.

In another embodiment, at 616 the process 600 is unable to match item details with information in the inventory system. In this case, the sale of item is inhibited as the sale cannot be audited later. Any sale of such merchandise will leave the cash in hand at the POS but the merchandise sold will remain unidentified in the inventory system leaving the business vulnerable to inventory, invoice theft and shrinkage (in the business). In one embodiment, inhibiting the sale of the item may further comprise providing a notification, such as an on-screen message on the POS terminal, that the description of the item is not stored in the inventory system. The cashier may then activate key 520 to retrieve the format from the system defined in FIG. 7. Alternatively, inhibiting the sale of the item may further comprise initiating the step to permit the entry of the identifying information in the POS terminal. More specifically, inhibiting the sale of the item may automatically retrieve the format from the system defined in FIG. 7. Sale of any unidentified merchandise (without scanning process) will also leave the security personnel and camera dysfunctional as security system does not oversee or supervise the approved method, procedure and operational function of POS system in the business. An efficient POS System will also be an effective tool to reduce the cost incurred on security personnel, camera & other equipments hired or purchased for the purpose.

At 618, the process 600 requests entry of identifying information in the POS terminal. The identifying information is configured to identify the item such that the description of the item can be stored in the inventory system, and such that the item can be identified at a later point in time. The identifying information may include various details of the item, and may also include a scanned image of the item. Depending upon internal controls instituted by the company, the process 600 may require the entry of the identifying information in the POS terminal. In response, the system may create a unique barcode. In an embodiment, the fewer than full details of the item may be entered into the POS terminal without providing a scanned image, with the process 600 still able to identify the item.

In another embodiment, the system may force the cashier to enter full (mandatory) details on a separate screen as defined in FIG. 7 or like, to compare with the inventory system in order to retrieve the related merchandise details that match with the merchandise details presented by the customer at the POS. If the system matches with the merchandise details then it will be able to generate the barcode of the item, which then can be printed on the sticky label and stuck to the merchandise. The cashier may then be able to scan the item with the bar code and complete the sale as a normal sale as the item can now be "identified, recognized and compared" with the inventory/data bank system as the specific merchandise sold will have the same barcode stored in the system designated to that merchandise.

At 620, the process 600 enables the cashier to take a printout of the barcode. It is now safe to make the sale to the customer as the item details have been added to the inventory. In an embodiment, an automatic email is sent to the department manager or the like and possibly higher authorities for review.

In another embodiment, after following the step 618 and if the item still cannot be found in the inventory system/data bank, then a picture or scanned image (2D or preferably 3D) of the item may be taken and restored in the screen as defined in FIG. 7 for the follow up and tracing purposes as to why the item was not in the Inventory/Data Bank System. The sale may continue as per store procedure or Manager's direction. The system may generate a unique barcode for such items that will later confirm the identification, sale and audit of such products. The unique barcode can be electronically saved as per FIG. 7 or printed on the sticky label and stick with the printed report after each such transaction. System may also print on customer receipt in bold letters "merchandise identified by cashier". Automatic E-mails may be sent to the Store Manager to show cause and the Higher Authorities (for example Director Purchasing, Marketing, Sales & Security) for their review and follow up as to why the merchandise failed to be scanned or identified at POS System. Thereafter the process 600 typically ends.

FIG. 7 is an inventory data bank, retrieval systems for unscannable (unidentified) merchandise/products. It may have the tertiary ability to retrieve and match the information from the data bank for all items that cannot be scanned or identified at the point of sale and or cash register, may be able to save the picture and or scanned image of the (unidentifiable) merchandise and may also be able to print the unique bar code and or store the image of the unique bar code with the related merchandise information.

In an embodiment, FIG. 7 illustrates an example display screen on a POS terminal. The display screen may be used, for example, as a touch screen. The example display screen includes information that can be auto generated as soon as the cashier uses the screen. Bar code standards may also be entered. Table 1 illustrates various example bar code standards, as well as example uses for the standards:

TABLE 1

| BAR CODE STANDARD | Example Uses |
|---|---|
| Uniform Product Code (UPC) | Retail stores for sales checkout; inventory, etc. |
| Code 39 (Code 3 of 9) | Identification, inventory, and tracking shipments |
| POSTNET | Encoding zip codes on U.S. mail |
| European Article Number (EAN) | A superset of the UPC that allows extra digits for country identification |
| Japanese Article Number (JAN) | Similar to the EAN, used in Japan |
| Bookland | Based on ISBN numbers and used on book covers |
| ISSN bar code | Based on ISSN numbers, used on periodicals outside the U.S. |
| Code 128 | Used in preference to Code 39 because it is more compact |
| Interleaved 2 of 5 | Used in the shipping and warehouse industries |
| Codabar | Used by Federal Express, in libraries, and blood banks |
| MICR (Magnetic Ink Character Recognition) | A special font used for the numbers on the bottom of bank checks |
| OCR-A | The optical character recognition format used on book covers for the human readable version of the ISBN number |
| OCR-B | Used for the human readable version of the UPC, EAN, JAN, Bookland, and ISSN bar codes and for optional human-readable digits with Code 39 and Interleaved 2 of 5 symbols |
| Maxicode | Used by the United Parcel Service |
| PDF417 | A new 2-D type of bar code that can encode up to 1108 bytes of information; can become a compressed, portable data file (which is what the "PDF" stands for) |

FIG. 7 also illustrates that data may be entered for unscannable merchandise or products. Such data may include the product name, manufacturer/distributor, the weight, the size, and other information to identify the merchandise or product, such as contents, ingredients, and the like. This information may be used as the identifying information. Moreover, FIG. 7 illustrates that a photograph or image (2D or preferably 3D) of the merchandise that cannot be identified or scanned at the POS or cash register may be stored. A label for a unique bar code may be printed, and a soft copy image of the bar code may also be stored.

In addition, in the depicted embodiment, the cashier may be provided with a message such as, "Data entry of the unidentified/unscannable merchandise is REQUIRED in the above format to identify the merchandise from the INVENTORY DATA BANK. Please ENTER the name of the product, Manufacturer/Distributor, weight, size, price and any other information that will help narrow the search and retrieve the most nearest findings/information of the merchandise from the inventory data bank in ALPHABETICAL ORDER." This will help sort out and retrieve the desired merchandise information for sale. If by any reason the merchandise is NOT available in the data bank then follow the FIG. 5 step 620 instructions. It is quite possible that entry of BAR CODE may retrieve the desired information.

Having now described certain embodiments of the disclosure, in terms of features, discoveries and principles, along with certain alternative construction and suggested changes, other changes may become apparent to those skilled in the art may be made, without departing from the scope of the invention defined in the appended claims.

It is further intended that any other embodiments of the present disclosure that result from any changes in application or method of use or operation, method of manufacture, shape, size, or material which are not specified within the detailed written description or illustrations contained herein yet are considered apparent or obvious to one skilled in the art are within the scope of the disclosure.

What is claimed is:

1. A method for inhibiting internal theft of items without inventory identifiers, the method comprising:
   receiving an item for sale at a POS terminal, wherein the item is missing an inventory identifier;
   determining whether a description of the item is stored in an inventory system;
   inhibiting the sale of the item in response to determining that the description of the item is not stored in the inventory system; and
   requesting the entry of identifying information into the POS terminal, the identifying information configured to identify the item such that the description of the item can be stored in the inventory system.

2. The method of claim 1, wherein requesting the entry of identifying information in the POS terminal further comprises requiring entry of the indentifying information in the POS terminal.

3. The method of claim 2, further comprising allowing the sale to proceed in response to the entry of the identifying information.

4. The method of claim 2, wherein requiring the entry of identifying information in the POS terminal further comprises providing a touch screen for the entry of the identifying information.

5. The method of claim 1, wherein requesting the entry of identifying information in the POS terminal further comprises obtaining a scanned image of the merchandise.

6. The method of claim 1, wherein requesting the entry of identifying information in the POS terminal further comprises requesting a description of the item.

7. The method of claim 1, further comprising identifying items within the inventory system in response to the entry of the identifying information.

8. The method of claim 7, wherein identifying items within the inventory system further comprises providing a barcode to identify the item in response to the entry of the identifying information.

9. The method of claim 1, wherein the inventory identifier is a barcode.

10. The method of claim 1, wherein the inventory identifier is a radio-frequency identification (RFID) device.

11. The method of claim 1, wherein inhibiting the sale of the item further comprises providing a notification that the description of the item is not stored in the inventory system.

12. The method of claim 1, wherein inhibiting the sale of the item further comprises initiating the step to permit the entry of identifying information in the POS terminal.

13. The method of claim 1, wherein determining whether the description of the item is stored further comprises comparing a scanned image of the item to images stored in the inventory system.

14. The method of claim 1, wherein determining whether the description of the item is stored further comprises comparing a description of the item to the descriptions of items stored in the inventory system.

15. The method of claim 1, further comprising forbidding the sale of merchandise through any assigned key in the POS Terminal, wherein the assigned key enables sales without providing the identifying information.

16. The method of claim 1, further comprising forbidding the sale of merchandise by an employee without providing the identifying information.

* * * * *